United States Patent
Ling et al.

(10) Patent No.: US 9,232,487 B2
(45) Date of Patent: Jan. 5, 2016

(54) SYNCHRONIZATION OF TRANSMISSION INTERVALS IN WI-FI

(71) Applicants: Jonathan Ling, North Brunswick, NJ (US); Dragan Samardzija, Highlands, NJ (US)

(72) Inventors: Jonathan Ling, North Brunswick, NJ (US); Dragan Samardzija, Highlands, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 97 days.

(21) Appl. No.: 13/679,406

(22) Filed: Nov. 16, 2012

(65) Prior Publication Data

US 2014/0140328 A1    May 22, 2014

(51) Int. Cl.
*H04W 24/00*    (2009.01)
*H04W 4/00*    (2009.01)
*H04W 56/00*    (2009.01)

(52) U.S. Cl.
CPC ................... *H04W 56/001* (2013.01)

(58) Field of Classification Search
USPC .......................... 370/336, 255, 235, 229, 230
See application file for complete search history.

(56) References Cited

U.S. PATENT DOCUMENTS

| | | | |
|---|---|---|---|
| 8,184,578 B2* | 5/2012 | Kazmi et al. | 370/329 |
| 8,305,885 B2* | 11/2012 | Ji et al. | 370/229 |
| 2011/0205998 A1* | 8/2011 | Hart et al. | 370/330 |
| 2012/0099460 A1* | 4/2012 | Murakami et al. | 370/252 |

OTHER PUBLICATIONS

Willenegger, S. "cdma2000 Physical Layer: An Overview" *Journal of Communications and Networks, Korean Institute of Communication Sciences*. vol. 2(1), XP-002420745.
Aweya, J. "Timing and Synchronizationof Wireless Base Stations over Packet Networks," *Circuits and Systems, 2011 IEEE*, XP-031941556.
Iordache, A.V., "LTE Network Time Synchronization," *Electronics and Telecommunications*, 2012 IEEE, XP-032302188.
International Search Report (PCT/ISA/210) for International Application No. PCT/US2013/068677 dated Feb. 21, 2014.
Written Opinion of the International Searching Authority (PCT/ISA/237) for International Application No. PCT/US2013/068677 dated Feb. 21, 2014.

* cited by examiner

*Primary Examiner* — Edan Orgad
*Assistant Examiner* — Sithu Ko
(74) *Attorney, Agent, or Firm* — Harness, Dickey & Pierce, P.L.C.

(57) ABSTRACT

An access point generates a data packet such that the data packet has a same packet length as a data packet from at least one other access point. The access point reserves a channel for a time interval, and initiates transmission of the data packet over the channel at a same time as transmission of the data packet from the at least one other access point. As a result, the access point synchronizes its transmission interval with a transmission interval of the at least one other access point which reduces inter-access point interference.

17 Claims, 5 Drawing Sheets

SYNCHRONIZATION OF TRANSMISSION INTERVALS IN WI-FI

BACKGROUND

Current Wi-Fi systems have unaligned time division duplexed (TDD) transmissions where one access point's (AP) downlink transmission may interfere with another access point's uplink transmission. This inter-AP interference is particularly a problem in high density networks where wireless channels between APs are stronger than wireless channels between APs and terminals. If the APs are not aligned in terms of the downlink and uplink transmission intervals, then transmission by one or more APs will strongly interfere and possibly block reception at other listening APs. This causes poor area capacity (bps/km$^2$), packet loss, and over all lower data rates.

FIG. 1 illustrates an example problem of unaligned transmissions from TDD Wi-Fi access points. FIG. 1 depicts a street canyon, where there is a direct Line of Sight (LOS) between the AP1 and AP2, and non-line-of-sight (NLOS) between the APs and terminals (user equipment UE1 and UE2). Thus, the coverage of AP2 is smaller than the interference range from AP1. If AP1 is transmitting a downlink signal DL at high power to UE1, AP2 will find it hard to hear a weak uplink signal UL from UE2.

SUMMARY

At least one example embodiment relates to an access point configured to synchronize its transmission interval with a transmission interval of at least one other access point in a communications network and/or a method of synchronizing a transmission interval of an access point with a transmission interval of at least one other access point in a communications network, which may reduce inter-access point interference.

According to at least one example embodiment, an access point is configured to generate a data packet such that the data packet has a same packet length as a data packet from at least one other access point. The access point is configured to reserve a channel for a time interval, and to initiate transmission of the data packet over the channel at a same time as transmission of the data packet from the at least one other access point.

According to at least one example embodiment, the access point is configured to set a look-ahead window for the channel if there is third party traffic on the channel, the look-ahead window containing a time when the channel is available for transmitting the data packet, and the look-ahead window being based on the third party traffic.

According to at least one example embodiment, the access point is configured to exclude the third party traffic on the channel during the reserved time interval.

According to at least one example embodiment, the access point is configured to refuse uplink transmission requests for the channel from a user terminal associated with the access point during the reserved time interval.

According to at least one example embodiment, an access point is configured to first seize a channel to hold the channel. The access point is configured to second seize the channel to initiate data transmission over the channel, the data transmission for the access point being initiated at a same time as initiation of data transmission for at least one other access point over the channel.

According to at least one example embodiment, the access point is configured to hold the channel by refusing uplink transmission requests for the channel from a user terminal associated with the access point.

According to at least one example embodiment, the access point is configured to set a look-ahead window if there is third party traffic on the channel, the look-ahead window containing a time when a channel is available for data transmission to or from the access point, and the access point is configured to exclude a third party access point from transmitting over the channel during the look-ahead window and the data transmission.

According to at least one example embodiment, a method of synchronizing data transmission includes generating a plurality of data packets, each data packet being associated with a different access point in a plurality of access points; reserving a channel for a time interval; and simultaneously initiating transmission of the plurality of data packets over the channel during the reserved time interval.

According to at least one example embodiment, the generating includes inserting dummy data into at least one data packet such that each data packet in the plurality of data packets has a same packet length.

According to at least one example embodiment, the simultaneously initiating transmission includes removing random back-off for the plurality of access points.

According to at least one example embodiment, the reserving includes broadcasting a reserve signal to refuse uplink transmission requests from user terminals associated with the plurality of access points during the reserved time interval.

According to at least one example embodiment, the reserving includes setting a look-ahead window for the channel if there is third party traffic on the channel, the look-ahead window containing a time when the channel is available for transmitting the plurality of data packets, and the look-ahead window being based on the third party traffic.

According to at least one example embodiment, the reserving includes broadcasting a reserve signal during the look-ahead window by the plurality of access points.

According to at least one example embodiment, the broadcasting the reserve signal holds the channel until the plurality of access points simultaneously initiate transmission of the plurality of data packets.

According to at least one example embodiment, the reserving includes preventing third party access point transmissions over the channel during the reserved time interval.

According to at least one example embodiment, a method of reserving a channel includes first seizing, by a plurality of access points, to hold the channel; and second seizing, by the plurality of access points, the channel to simultaneously initiate data transmission to or from the plurality of access points.

According to at least one example embodiment, the first seizing includes refusing uplink transmission requests for the channel from user terminals associated with the plurality of access points.

According to at least one example embodiment, the method further includes setting a look-ahead window in the plurality of access points if there is third party traffic on the channel, the look-ahead window containing a time when the channel is available for transmitting data packets to or from the plurality of access points, the look-ahead window being based on third party traffic.

According to at least one example embodiment, the first seizing includes preventing a third party access point from transmitting over the channel during the look-ahead window and the data transmission.

According to at least one example embodiment, the method further includes generating data packets for each of the plurality of access points such that each data packet has a same packet length.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Figure 1:
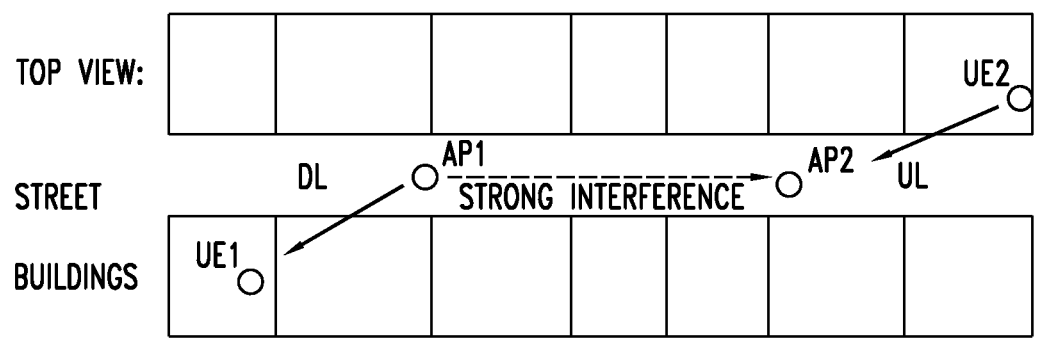
FIG. 1 illustrates unaligned time division duplexed (TDD) Wi-Fi transmissions resulting in inter-access point interference.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs, eNodeBs, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof.

When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 2:
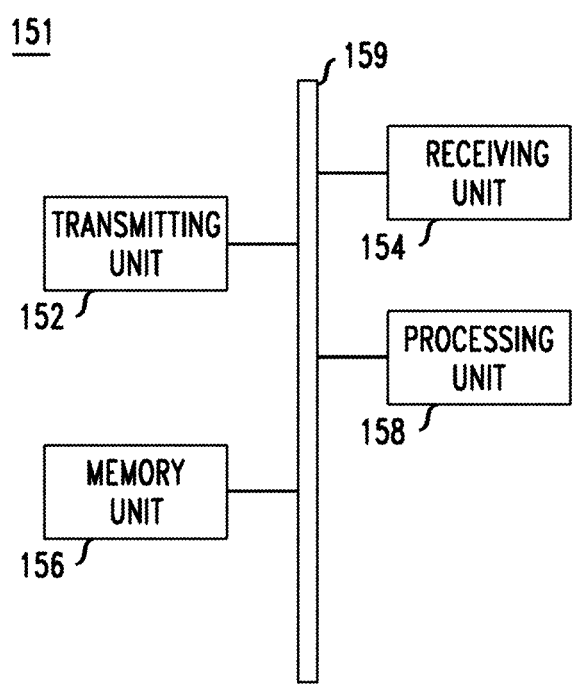
FIG. 2 is a diagram illustrating an example structure of an access point in a communications network according to at least one example embodiment.

FIG. 2 is a diagram illustrating an example structure of an access point according to an example embodiment. According to at least one example embodiment, an access point (AP) 151 may be configured for use in a communications network (e.g., a Wi-Fi network). Referring to FIG. 2, the access point 151 may include, for example, a data bus 159, a transmitting unit 152, a receiving unit 154, a memory unit 156, and a processing unit 158.

The transmitting unit 152, receiving unit 154, memory unit 156, and processing unit 158 may send data to and/or receive data from one another using the data bus 159. The transmitting unit 152 is a device that includes hardware and any necessary software for transmitting wireless signals including, for example, data signals, control signals, and signal strength/quality information via one or more wireless connections to other network elements in a communications network.

The receiving unit 154 is a device that includes hardware and any necessary software for receiving wireless signals including, for example, data signals, control signals, and signal strength/quality information via one or more wireless connections to other network elements in a communications network.

The memory unit 156 may be any device capable of storing data including magnetic storage, flash storage, etc.

The processing unit 158 may be any device capable of processing data including, for example, a microprocessor configured to carry out specific operations based on input data, or capable of executing instructions included in computer readable code. For example, it should be understood that the modifications and methods described below, with reference to FIGS. 3, 4 and 5, may be stored on the memory unit 156 and implemented by the processing unit 158 within AP 151 from FIG. 2.

Figure 3:
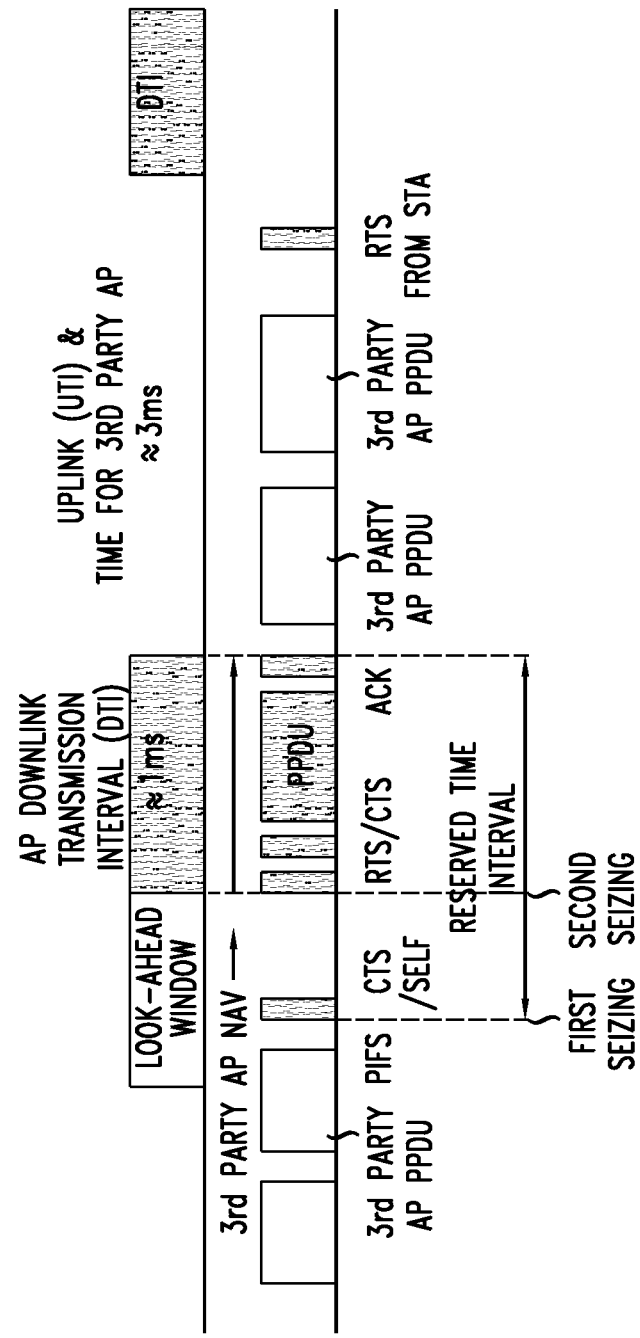
FIG. 3 illustrates a timeline of a protocol for aligning TDD transmissions in a Wi-Fi network according to at least one example embodiment.

FIG. 3 illustrates a timeline of a protocol for aligning time division duplexed (TDD) Wi-Fi transmissions according to at least one example embodiment. As such, the discussion of example embodiments includes some terms, techniques, and structures considered to be well-known within the IEEE 802.11 standards (i.e., 802.11a, 802.11b, 802.11g, etc.). Accordingly, detailed discussions of well-known terms, techniques, and structures have been omitted from this description. It should also be understood that this description should make apparent to one of ordinary skill in the art how to implement the below described modifications, methods, and devices into existing protocol and existing systems.

According to FIG. 3, multiple access points (APs) in a Wi-Fi network have an identical downlink transmission interval (DTI). In other words, multiple APs simultaneously initiate data transmission over a channel at a beginning of the DTI, and simultaneously conclude the DTI with acknowledgements ACK. Each participating AP has a network wide time, via GPS or network protocol by which downlink transmission intervals are defined.

According to at least one example embodiment, coordination of APs wishing to take part in the aligned transmission may occur through a central server. For example, APs wishing to participate in transmission alignment may register their individual MAC addresses with a central server that is broadcasting a time for the aligned transmission. Alternatively, APs may coordinate the aligned transmission via a self-organizing system, where some APs are broadcasting a time for the aligned transmission to allow other listening APs to join the aligned transmission. Access points participating in the transmission alignment may be referred to as APs or participating APs. APs not participating in the DTI alignment may be referred to as third party APs or third party transmissions.

According to at least one example embodiment, there are some key modifications to the media access control (MAC) layer which allow participating APs to align their transmissions. First, MAC protocol is modified so that each participating AP creates identical packet start and finish times. A second modification to the AP MAC layer includes refusing uplink transmissions that would overlap the downlink transmission interval (DTI), thereby preventing the DTI from being utilized by each of the APs' associated terminals. A third modification to the AP MAC layer includes reserving the DTI, thereby preventing the DTI from being utilized by third party APs.

The above modifications to the MAC protocol as executed by each participating AP are discussed below with reference to FIGS. 3, 4 and 5. It should be understood that these modifications and below described methods may be stored on a memory unit 156 and implemented by a processing unit 158 within a network element 151 from FIG. 2.

Figure 4:
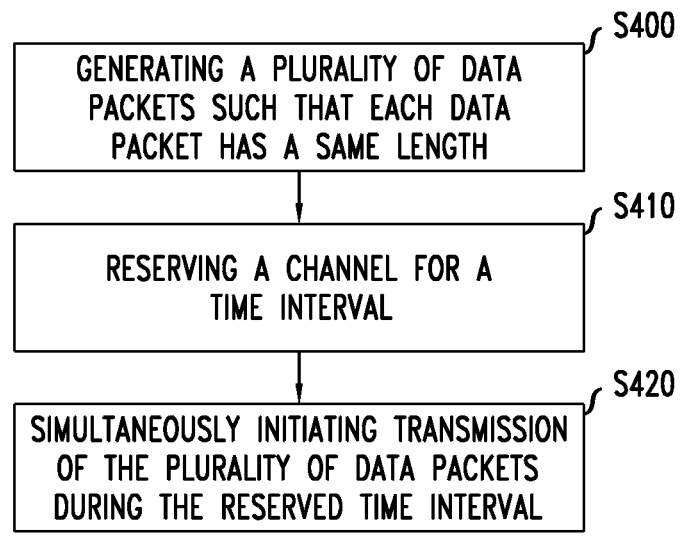
FIG. 4 is a flow diagram of a method for aligning transmissions in a Wi-Fi network according to an example embodiment.

FIG. 4 illustrates a flow diagram of a method for aligning transmissions in a Wi-Fi network according to at least one example embodiment.

In step S400 of FIG. 4, participating APs generate a plurality of data packets such that each data packet has a same packet length. Referring to FIGS. 3 and 4, this may be accomplished by each AP creating identical over-the-air packet lengths for physical layer protocol data units (PPDU) by inserting dummy data or dummy packet(s), where desired, into an aggregated MAC service data unit (A-MSDU). As a result, the packets for each participating AP may have a same number of orthogonal frequency-division multiplexing (OFDM) symbols (i.e., a same packet length).

In step S410 of FIG. 4, each participating AP reserves a channel for a desired (or alternatively, predetermined) time interval. Referring to FIGS. 3 and 4, the reserved time interval may span from a time of broadcasting a reserve signal (e.g., a CTS-to-self signal) to an end of the DTI (e.g., acknowledgement ACK). According to at least one example embodiment, step S410 may include refusing uplink transmission requests that would overlap the DTI from user terminals associated with the participating APs, thereby reducing (or alternatively, preventing) the DTI from being utilized by each of the participating APs' associated user terminals. For example, a participating AP may refuse uplink transmissions of associated user terminals when the AP receives a RTS signal or a header of an uplink packet that will overlap with the DTI. If there is third party traffic on the channel, step S410 may include reducing (or alternatively, excluding) third party transmissions over the channel. The reservation process is described in more detail below with reference to FIG. 5.

Still referring to FIG. 4, in step S420, participating APs simultaneously initiate transmission of the plurality of data packets during the reserved time interval. For example, each participating AP transmits a RTS signal at a beginning of a same DTI. According to at least one example embodiment, this may be accomplished by removing random back-off within the MAC protocol of each participating AP. As shown in FIG. 4, the DTI for each participating AP ends at a same time. Thus, acknowledgments ACKs are received without interference because each AP sets its packet length to be a same length as packets from other participating APs in step S400. Thus, the participating APs uplink transmission may also be synchronized. In this way, participating APs may be said to have synchronized transmission intervals.

Figure 5:
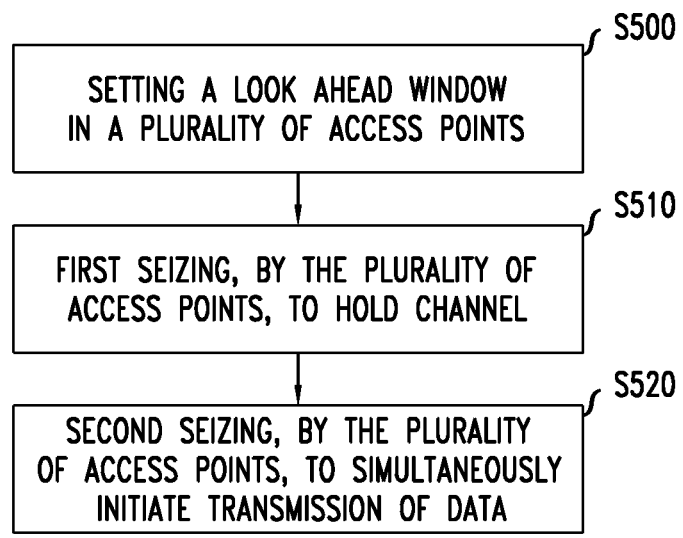
FIG. 5 is a flow diagram of a method for reserving a channel in a Wi-Fi network according to an example embodiment.

FIG. 5 illustrates a flow diagram of a method for reserving a channel in a Wi-Fi network according to an example embodiment.

Referring to FIG. 3 and step S500 in FIG. 5, each participating AP sets a variable length look-ahead window based on the packet statistics of third party traffic. According to at least one example embodiment, the look-ahead window contains a time when the channel is available for transmitting data packets to or from the participating APs. That is, the look-ahead window may contain a time when the channel is free from third party transmissions. According to at least one example embodiment, the length of the look-ahead window is set such that, with high probability, participating APs will be able to seize a channel at the start of the DTI.

According to the example reservation method of FIG. 5, each participating AP may perform two seizing operations on a channel.

Referring to FIG. 5, each participating AP waits for the channel to be free from third party traffic for a period of a priority interframe space (PIFS). After the channel is free for the PIFS, each participating AP may perform a first seizing of the channel to hold the channel in step S510.

According to at least one example embodiment, the first seizing in step S510 may include refusing uplink transmission requests that would overlap the DTI from user terminals associated with the participating APs, thereby reducing (or alternatively, preventing) the DTI from being utilized by each of the participating APs' associated user terminals. For example, a participating AP may refuse uplink transmissions of associated user terminals when the AP receives a RTS signal or a header of an uplink packet that will overlap with the DTI. If there is third party traffic on the channel, the first seizing in step S510 may include reducing (or alternatively, preventing) third party transmissions over the channel.

If there is not a possibility for third party traffic on the channel, each participating AP may accomplish the first seizing by broadcasting a reserve signal (e.g., a CTS-to-self signal) having a transmission duration that lasts until the start of the DTI. Here, the reserve signal holds the channel until the participating APs simultaneously initiate transmission (i.e., until the second seizing). That is, the reserve signal informs user terminals associated with the participating APs to stop sending request to send (RTS) signals. As such, it may be said that the participating Aps are holding the channel by refusing uplink transmissions from the user terminals. If there is a possibility of third party traffic on the channel, then the reserve signal may hold the channel until the end of the DTI. Consequently, third party APs update their network allocation vector (NAV) to 'busy,' thereby preventing third party AP transmissions over the channel during the look-ahead window and the DTI.

In step S520, each participating AP performs a simultaneous second seizing to simultaneously initiate transmission of data by each of the participating APs. For example, the participating APs perform the second seizing at the start of the DTI. As shown in FIG. 3, each participating AP performs the simultaneous second seizing by broadcasting a RTS signal to seize the channel. Referring to FIGS. 3 and 5, the channel may be reserved from the first seizure to an end of the DTI.

FIG. 5 describes a method of reserving a channel where there is third party traffic on the channel. However, it should be understood that steps S510 and S520 would be sufficient for reserving a channel if there is no third party traffic present. Further, it should be understood that the method of FIG. 5 may be implemented as step S410 in FIG. 4.

Synchronization of transmission intervals according to at least one example embodiment described above may reduce (or alternatively, prevent) inter-access point interference, reduce (or alternatively, prevent) packet loss, and preserve desired data rates in a communications network, particularly in a high density communications network where multiple access points overlap in coverage. Further, implementation of the above described example embodiments may be relatively simple and cost-effective.

Variations of the example embodiments are not to be regarded as a departure from the spirit and scope of the example embodiments. All such variations as would be apparent to one skilled in the art are intended to be included within the scope of this disclosure.

What is claimed is:

1. An access point configured to:
generate a data packet such that the data packet has a same packet length as a data packet from at least one other access point,
predict, if there is third party traffic on a channel, a time when the channel is expected to be available for transmitting the data packet based on packet statistics of the third party traffic,
set a look-ahead window during the predicted time for the channel,
reserve, while within the look-ahead window, the channel for a time interval, and
initiate transmission of the data packet over the reserved channel at a same time as transmission of the data packet from the at least one other access point.

2. The access point of claim 1, wherein the access point is configured to exclude the third party traffic on the channel during the reserved time interval.

3. The access point of claim 1, wherein the access point is configured to refuse uplink transmission requests for the channel from a user terminal associated with the access point during the reserved time interval.

4. An access point configured to:
predict, if there is third party traffic on a channel, a time when the channel is expected to be available for transmitting the data packet based on packet statistics of the third party traffic,
set a look-ahead window during the predicted time for the channel,
first seize, while within the look-ahead window, the channel to hold the channel, and
second seize the channel to initiate data transmission over the channel, the data transmission for the access point being initiated at a same time as initiation of data transmission for at least one other access point over the channel.

5. The access point of claim 4, wherein the access point is configured to hold the channel by refusing uplink transmission requests for the channel from a user terminal associated with the access point.

6. The access point of claim 4, wherein
the access point is configured to exclude a third party access point from transmitting over the channel during the look-ahead window and the data transmission.

7. A method of synchronizing data transmission, the method comprising:
generating a plurality of data packets, each data packet being associated with a different access point in a plurality of access points;
predicting, if there is third party traffic on a channel, a time when the channel is expected to be available for transmitting the data packet based on packet statistics of the third party traffic,
setting a look-ahead window during the predicted time for the channel;
reserving, during the look-ahead window, the channel for a time interval; and
simultaneously initiating transmission of the plurality of data packets over the channel during the reserved time interval.

8. The method of claim 7, wherein the generating includes inserting dummy data into at least one data packet such that each data packet in the plurality of data packets has a same packet length.

9. The method of claim 7, wherein the simultaneously initiating transmission includes removing random back-off for the plurality of access points.

10. The method of claim 7, wherein the reserving includes broadcasting a reserve signal to refuse uplink transmission requests from user terminals associated with the plurality of access points during the reserved time interval.

11. The method of claim 9, wherein the reserving includes broadcasting a reserve signal during the look-ahead window by the plurality of access points.

12. The method of claim 11, wherein the broadcasting the reserve signal holds the channel until the plurality of access points simultaneously initiate transmission of the plurality of data packets.

13. The method of claim 7, wherein the reserving includes preventing third party access point transmissions over the channel during the reserved time interval.

14. A method of reserving a channel, comprising:
predicting, if there is third party traffic on a channel, a time when the channel is expected to be available for transmitting the data packet based on packet statistics of the third party traffic,
setting a look-ahead window during the predicted time for the channel;
first seizing, by a plurality of access points during the look-ahead window, to hold the channel; and
second seizing, by the plurality of access points, the channel to simultaneously initiate data transmission to or from the plurality of access points.

15. The method of claim 14, wherein the first seizing includes refusing uplink transmission requests for the channel from user terminals associated with the plurality of access points.

16. The method of claim 14, wherein the first seizing includes preventing a third party access point from transmitting over the channel during the look-ahead window and the data transmission.

17. The method of claim 14, further comprising:
generating data packets for each of the plurality of access points such that each data packet has a same packet length.

* * * * *